United States Patent
Sueoka

(10) Patent No.: US 6,479,980 B1
(45) Date of Patent: Nov. 12, 2002

(54) THIN FILM SPIN PROBE

(75) Inventor: Kazuhisa Sueoka, Sapporo (JP)

(73) Assignee: Agency of Industrial Science and Technology, Saitama-Ken (JP)

( * ) Notice: Subject to any disclaimer, the term of this patent is extended or adjusted under 35 U.S.C. 154(b) by 1 days.

(21) Appl. No.: 09/623,526

(22) PCT Filed: Jan. 25, 1999

(86) PCT No.: PCT/JP99/00264

§ 371 (c)(1),
(2), (4) Date: Oct. 2, 2000

(30) Foreign Application Priority Data

Feb. 5, 1998 (JP) .......................................... 10-024447

(51) Int. Cl.$^7$ ............................................... G01R 31/00
(52) U.S. Cl. ........................ 324/96; 324/537; 324/752; 324/72.5
(58) Field of Search ................................. 324/752, 570, 324/96, 763, 765, 72.5, 537, 702

(56) References Cited

U.S. PATENT DOCUMENTS

| 4,494,069 | A | * | 1/1985 | Lin | ............................. 324/752 |
| 4,855,591 | A | * | 8/1989 | Nakamura et al. | ......... 324/96 X |
| 4,864,222 | A | * | 9/1989 | Aoshima et al. | ............... 324/96 |
| 5,406,194 | A | * | 4/1995 | Dykaar et al. | ................. 324/96 |
| 5,559,330 | A | * | 9/1996 | Murashita | .................... 250/306 |
| 5,642,040 | A | * | 6/1997 | Takahashi et al. | ............. 324/96 |
| 6,303,218 | B1 | * | 10/2001 | Kamaguchi et al. | ......... 428/332 |

FOREIGN PATENT DOCUMENTS

| JP | 6-268283 | 8/1994 |
| JP | 6-289035 | 10/1994 |
| JP | 7-253456 | 10/1995 |
| JP | 10-106465 | 4/1998 |
| JP | 2000-156530 | * 3/1999 |

OTHER PUBLICATIONS

Sueoka, Kazuhisa et al. *The Study of a Thin GaAs Tip.* Hyomen Kagaku, vol. 19, No. 8: pp. 522 to 526, 1998.

Kimura, M. et al. *Measurement of Spin–Relaxation Times by Time–Resolved Photoluminescence.* Journal of Applied Magnetics Association of Japan, vol. 20, No. 2:p. 253–256, 1996.

* cited by examiner

*Primary Examiner*—N. Le
*Assistant Examiner*—T. R. Sundaram
(74) *Attorney, Agent, or Firm*—Rader, Fishman & Grauer PLLC

(57) ABSTRACT

The thin film spin probe is particularly suited for measurement of spin-polarized components which are parallel with or vertical to the surface of a specimen to be measured. A thin film 2 supporting another thin film of the active probing region is formed on substrate 1. The thin film 3 of the active probing region is formed on said thin film 2. A specified section of said substrate is then removed by selective etching.

6 Claims, 5 Drawing Sheets

FIG. 1A
FIG. 1B
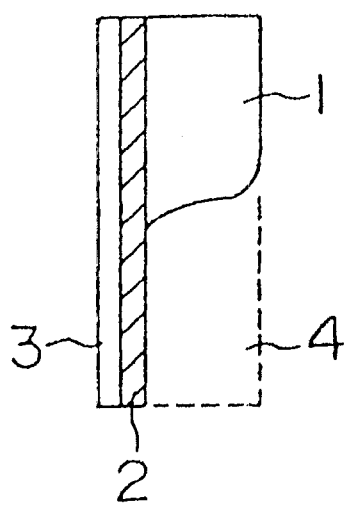
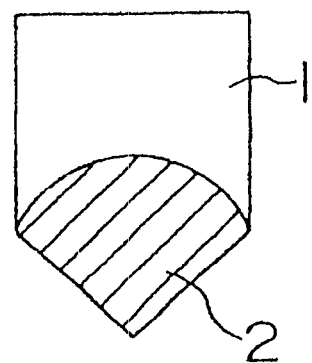

THIN FILM SPIN PROBE

FIELD OF THE INVENTION

The present invention relates to a thin film spin probe used on spin polarized scanning tunneling microscopes. More particularly, the present invention relates to a thin film spin probe that is capable of measuring the spin-polarized components parallel with and vertical to the surface of a specimen.

BACKGROUND TECHNOLOGY

A probe manufactured by cleaving semiconductor single crystals is used in an attempt to measure the spin-polarized components on specimen surfaces under a scanning tunneling microscope.

Figure 6:
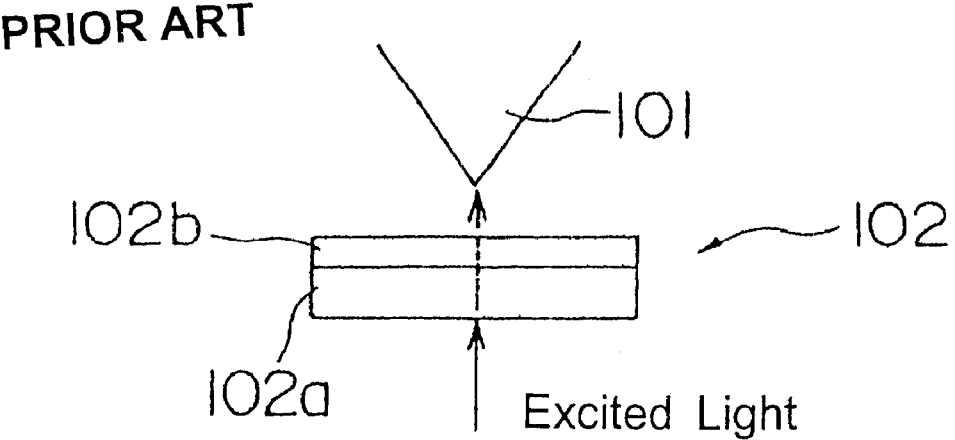

An example of measuring the spin polarized components using said probe is described referring to FIG. 6. In FIG. 6, 101 is a probe manufactured by cleaving a semiconductor single crystal. 102 is a specimen for measuring spin-polarized components. The specimen 102 comprises a magnetic film 102b (specimen) which is sufficiently thin to allow the transmission of excitation light and a transparent board or a substrate 102a (glass, mica, etc.) supporting said magnetic film. To measure, excitation light is transmitted through and vertical to the specimen as shown in the figure. The transmitted light is irradiated on the probe 101 to detect spin polarization perpendicular to the surface of the specimen 102b.

The problems encountered with this method are:

a) To optically excite the probe, excitation light must pass through the specimen from the thin specimen side. This limits the thickness of the specimen.

b) Because the probe that is manufactured by cleaving semiconductors is thick, even when light is irradiated from the probe side perpendicular to the surface of the specimen, the excitation light can penetrate only 1 μm into the surface at best, due to the large absorption constant. Efficient electron excitation at the tip cannot be expected.

c) Excitation light is incident from the probe side when measuring the components on the surface of a specimen (parallel components). Effective excitation is thus impossible because of the three-dimensional spread of the probe.

d) It is difficult to embed into a thin film spin probe a quantum structure designed to control spin polarization of excited electrons to enhance light emitting efficiency. It is therefore difficult to manufacture light emitting thin film spin probes.

With a view to solving these conventional problems, an object of the present invention is to provide a novel thin film spin probe by forming a thin GaAs/AlGaAs film on a GaAs board or a substrate using a thin film forming unit and by partly removing said substrate by selective etching.

The present invention further intends to solve the above problems by offering light emitting thin film spin probes comprising a GaAs substrate, a transparent support film made of AlGaAs, etc., formed on said substrate using a thin film forming unit, a thin film accommodating a light emitting region formed on said support film, and a thin barrier layer formed on said light emitting film, wherein said substrate is partly removed by selective etching.

DISCLOSURE OF THE INVENTION

The thin film spin probe of the present invention can be sufficiently thin as to allow excitation light to pass through it so that excitation light can be irradiated from the prober side, eliminating the restriction on the thickness of specimens to be measured.

It is also possible to alleviate the magnetic circular two-color effects that occur when the specimen excitation light is transmitted.

It is possible, by using semiconductor hetero-junction manufacturing technology, to embed a structure to effectively contain excitation carriers or a structure to control spin polarization.

Thin film spin probes are generally effective also for measuring the spin-polarized components that are horizontal with the surface of a specimen. In such an application, the thin film spin probes with a semiconductor hetero-junction can effectively contain carriers and alleviate the reduction in polarization that is one of the problems with single crystal cleaved probes.

As for light emission that is difficult to detect with a single crystal cleaved probe, the use of the quantum well structure enhances the efficiency of light emission. It is thus possible to measure spin polarization with a high sensitivity.

BRIEF-DESCRIPTION OF THE DRAWINGS

FIGS. 1(A) and 1(B) are a side and a front view, respectively, of the thin film spin probe of the first working example of the present invention.

Figure 2:
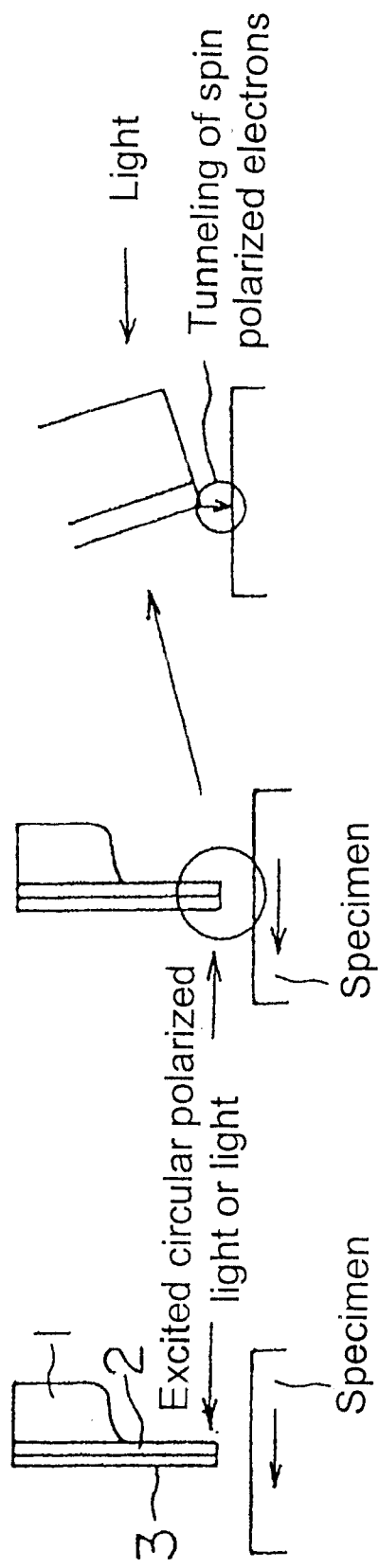
Figure 3:
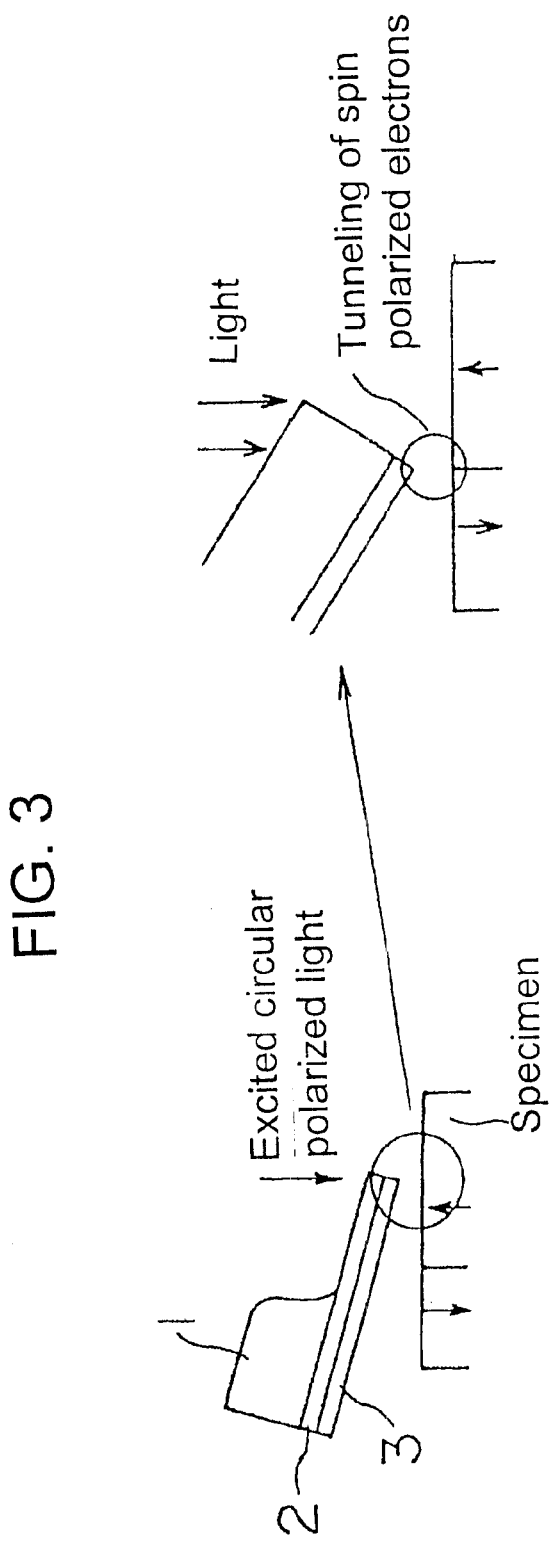

FIGS. 2 and 3 describe measurement of spin-polarized components parallel with and vertical to the specimen surface, respectively.

Figure 4:
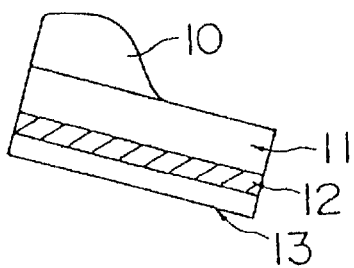

FIG. 4 is a side view of the light emitting thin film spin probe of the second working example of the present invention.

Figure 5:
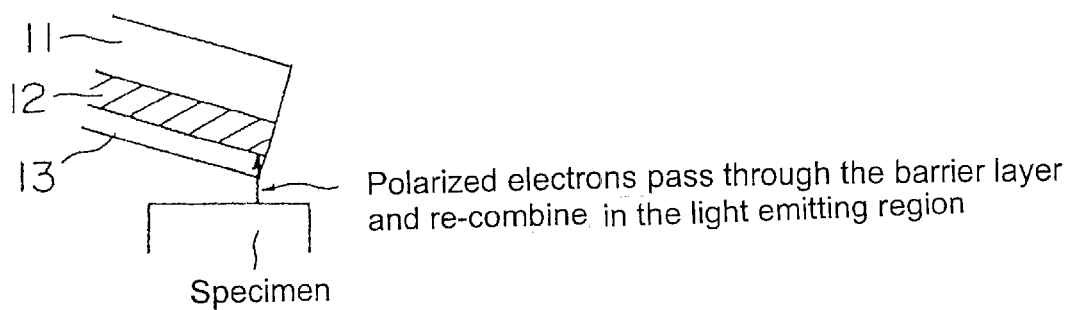

FIG. 5 describes the measurement of spin polarized components in the specimen surface using the thin film spin probe of the second-working example of the present invention.

FIG. 6 describes the measurement of spin polarized components in the specimen surface according to a conventional method.

PREFERRED FORM OF IMPLEMENTING THE INVENTION

The form of implementing the present invention is described in detail with reference to the drawings.

FIGS. 1(A) and (B) are a side and a front views, respectively, of the thin film spin probe of the first working example of the present invention.

In FIG. 1, 1 is a thin film spin probe substrate consisting of, for example, GaAs. On substrate 1, an AlGaAs thin film 2 is formed using a thin film forming unit designed for forming current III-V compound semiconductor multilayer films by molecular beam epitaxy (MBE), liquid phase epitaxy (LPE), chemical vapor deposition (CVD), metalorganic CVD (MOCVD), etc. A GaAs thin film 3 is formed on top of the film.

The AlGaAs film 2 is transparent to excitation light. It supports the active probing region.

The GaAs film 3 provides the active probing region. It contains optical excitation carriers and has a quantum structure such as quantum well and multi-quantum well.

The thin film 3 controls carrier and spin life and also spin polarization.

A part 4 of the substrate 1 with two layers of thin films formed on it as described above is then removed (see FIG. 1(A)) by selective etching using an alkaline etchant. The center of the remaining film is cleaved in two directions to form a thin film spin probe such as shown in FIG. 1.

An example of measurement of spin polarization on a specimen surface using the thin film spin probe of the above working example of the present invention is described below.

FIG. 2 shows a method to measure the spin polarization components parallel with the specimen surface. A thin film spin probe is placed nearly vertical to the specimen surface as shown in the figure. Exciting circular polarization light is made to strike the thin film spin probe in the vertical direction (nearly parallel with the, specimen surface). The electrons tunnel as shown in FIG. 2. By measuring the electric current, the spin polarization components parallel with the specimen surface can be measured.

FIG. 3 shows a method to measure the spin polarization components vertical to the specimen surface. A thin film spin probe is placed nearly parallel with the specimen surface as shown in the figure. Exciting circular polarization light is made to strike the thin film spin probe in the vertical position (nearly vertical to the specimen surface). The electrons tunnel as shown in FIG. 3. By measuring the electric current, the spin polarization components parallel with the specimen surface can be measured.

FIG. 4 is a side view of a light emitting thin film spin probe of the second working example of the present invention.

In FIG. 4, 10 is a substrate comprising a thin film spin probe made of, for example, GaAs. A transparent support AlGaAs film 11 is formed on said substrate 10 using a thin film forming unit designed for forming current III-V compound semiconductor multi-layer films by molecular beam epitaxy (MBE), liquid-phase epitaxy (LPE), chemical vapor deposition (CVD), metal-organic CVD (MOCVD), etc. A GaAs thin film 12 comprising a light emitting region is formed on top of the film. This is further covered with a formed thin barrier layer 13 made of AlAs, etc.

The substrate 1 with the three layers formed on it as above is then partly removed by selective etching using alkaline etchants in the same way as with the first working example of the present invention. The remaining thin film section is cleaved at the center in two directions to form a thin film spin probe.

FIG. 5 illustrates the measurement of spin-polarized components on the specimen surface using a thin film spin probe of the second working example of the present invention. As shown in FIG. 5, when a thin film spin probe is placed nearly parallel with the specimen, the polarized electrons in the specimen will pass through the barrier layer of the thin film spin probe, and re-combine at the light emitting region, emitting light. Measurement of this light allows measurement of the spin-polarized components of the specimen.

The forms of implementation of the present invention have been described. The substrate materials, support film materials, probing region materials, and light emitting materials, for example, are not limited to the above, but any materials capable of performing the above functions may be used. These materials include, for example, InP, InAs, GaP, GaN and other III-V compound semiconductors and their crystals. In addition, the present invention can be implemented in any other form without deviating from the spirit or the main features thereof. For this reason, the above-mentioned embodiments are only a few examples and should not be construed as limiting examples. As typically represented by the above-mentioned embodiments of the present invention, the following excellent effects are achieved:

(1) The parallel and vertical spin polarized components on a specimen surface can be measured accurately and easily.

(2) There is no limit to the thickness of a specimen to be measured. It is possible to excite and irradiate from the surface of the specimen. The spin polarized components vertical to the specimen can be measured.

(3) The interfacially controlled hetero structure can be used to make a light emitting detection probe.

Feasible Industrial Use and Applications

The, present invention enables the production of thin film spin probes that are thin enough to allow transmission of excitation light through them, thereby allowing irradiation of excitation light from the probe side and thus eliminating the limitation on the thickness of a specimen to be measured. It is also possible to reduce the magnetic circular two-color effects that occur when the excitation light transmits through the specimen. The use of semiconductor hetero-junction manufacturing technology makes it possible to produce probes with a structure that effectively contains excitation carriers or a structure that controls the spin polarized state. The thin film spin probe is also effective for measuring spin-polarized components that are horizontal with the specimen. A thin film spin probe with a semiconductor hetero-junction can thus effectively contain carriers and-reduce the degree of reduction in polarization which is one of the problems of single crystal cleaved probes. Light emission that is difficult to detect with a single crystal cleaved probe can be detected with enhanced efficiency by using the quantum well structure. It is therefore possible to measure spin polarization with high sensitivity.

What is claimed is:

1. A thin film spin probe comprising:

a board, a first thin film formed on said board to support another thin film of the active probing region, and said another thin film of the active probing region formed above said first thin film, wherein a specified section of said board is removed by selective etching, wherein said board is made of GaAs, said first thin film to support said another thin film of the active probing region made of AlGaAs, and said another thin film of the active probing region made of GaAs.

2. A thin film spin probe which comprises:

a board, a transparent support film formed on said board, a thin film comprising a light emitting region formed above said support film, and a thin barrier layer formed above said thin film, wherein a specified section of said board is removed by selective etching.

3. The thin film spin probe as claimed in claim 2 characterized in that said substrate is made of GaAs, said transparent support film is made of AlGaAs, said thin film comprising a light emitting region is made of GaAs, and said thin barrier layer is made of AlAs.

4. Any thin film spin probe as claimed in claims 1, 2 and 3 wherein said thin film formed on said board is formed by a thin film forming unit.

5. A thin film spin probe comprising:

a first thin-layer formed on a substrate, which is an active probe area, comprising AlGaAs is formed using a thin film forming device, and a second thin-layer that is an active probe area comprising GaAs having the sealing function of an optical excitation carrier is formed using said thin film forming device, wherein a portion of said substrate is removed.

6. A thin film spin probe comprising:

a transparent supporting film comprised of AlGaAs is formed on a substrate using a thin-layer forming device, a thin layer comprised of GaAs that structures an illuminating area is formed on said transparent supporting film, a barrier wall comprised of AlAs is formed on top of said thin layer, and wherein a portion of said substrate is removed.

* * * * *